United States Patent

Chang et al.

[11] Patent Number: 5,835,962
[45] Date of Patent: Nov. 10, 1998

[54] PARALLEL ACCESS MICRO-TLB TO SPEED UP ADDRESS TRANSLATION

[75] Inventors: Chih-Wei David Chang, Saratoga; Kioumars Dawallu, San Jose; Joel F. Boney, Cupertino; Ming-Ying Li, Sunnyvale; Jen-Hong Charles Chen, San Jose, all of Calif.

[73] Assignee: Fujitsu Limited, Japan

[21] Appl. No.: 772,835

[22] Filed: Dec. 24, 1996

Related U.S. Application Data

[63] Continuation of Ser. No. 397,810, Mar. 3, 1995, abandoned.

[51] Int. Cl.$^6$ .............................. G06F 12/10; G06F 9/22
[52] U.S. Cl. ..................... 711/206; 711/202; 711/205; 711/204; 711/145; 711/151; 711/152; 711/158; 711/163
[58] Field of Search .................................... 395/412, 415, 395/416, 417, 440, 494, 495, 485, 478; 711/202, 205, 206, 204, 113, 151, 152, 158, 163, 145

[56] References Cited

U.S. PATENT DOCUMENTS

| | | | |
|---|---|---|---|
| 4,628,451 | 12/1986 | Sawada et al. | 395/416 |
| 4,792,897 | 12/1988 | Gotou et al. | 395/417 |
| 4,985,828 | 1/1991 | Shimizu et al. | 395/419 |
| 5,222,223 | 6/1993 | Webb, Jr. et al. | 395/467 |
| 5,305,444 | 4/1994 | Becker et al. | 395/417 |
| 5,319,760 | 6/1994 | Mason et al. | 395/418 |
| 5,386,527 | 1/1995 | Bosshart | 395/403 |
| 5,388,215 | 2/1995 | Baker et al. | 395/200.01 |
| 5,426,750 | 6/1995 | Becker et al. | 395/417 |
| 5,428,757 | 6/1995 | Sutton | 395/650 |

*Primary Examiner*—Eddie P. Chan
*Assistant Examiner*—Than V. Nguyen
*Attorney, Agent, or Firm*—Skjerven, Morrill, MacPherson, Franklin & Friel LLP; Norman R. Klivans

[57] ABSTRACT

A memory management unit (MMU) includes a translation lookaside buffer capable of simultaneously servicing three requests supplied to the MMU by an instruction cache and two data caches, respectively. Also, an arbiter selects one of several pending requests from sources of different priorities for immediate processing by the MMU, using a process which avoids undue delay in servicing requests from sources of lower priority.

10 Claims, 3 Drawing Sheets

Microfiche Appendix Included
(3 Microfiche, 224 Pages)

PARALLEL ACCESS MICRO-TLB TO SPEED UP ADDRESS TRANSLATION

RELATED APPLICATIONS

This application is a continuation of application Ser. No. 08/397,810, filed Mar. 3, 1995, now abandoned.

The subject matter of this application is related to the subject matter of the following applications:

application Ser. No. 08/397,809 entitled "LOOKASIDE BUFFER FOR ADDRESS TRANSLATION IN A COMPUTER SYSTEM" filed on Mar. 3, 1995 by Leon Kuo-Liang Peng, Yolin Lih and Chih-Wei David Chang now U.S. Pat. No. 5,680,566 issued Oct. 21, 1997.

application Ser. No. 08/388,602 entitled "INSTRUCTION FLOW CONTROL CIRCUIT FOR SUPERSCALER MICROPROCESSOR" filed on Feb. 14, 1995 by Takeshi Kitahara;

application Ser. No. 08/517,299, a continuation of application Ser. No. 08/388,389 (now abandoned) entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/518,549, a continuation of application Ser. No. 08/388,606 (now abandoned) entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/516,230, a continuation of application Ser. No. 08/388,364 (now abandoned) entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,883 entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/522,567, a continuation of application Ser. No. 08/397,893 (now abandoned) entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/523,384, a continuation of application Ser. No. 08/397,891 (now abandoned) entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

application Ser. No. 08/397,911 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284 entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/524,294, a continuation of Application Ser. No. 08/398,066 (now abandoned) entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/397,910 entitled "METHOD AND APPARATUS FOR RAPID EXECUTION OF CONTROL TRANSFER INSTRUCTIONS" filed on Mar. 3, 1995 by Sunil Savkar;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800 entitled "METHOD AND APPARATUS FOR GENERATING ZERO BIT STATUS FLAG IN A MICROPROCESSOR" filed on Mar. 3, 1995 by Michael Simone; and application Ser. No. 08/397,912 entitled "ECC PROTECTED MEMORY ORGANIZATION WITH PIPELINED READ MODIFY-WRITE ACCESS" filed on Mar. 3, 1995 by Chien Chen and Yizhi Lu;

each of the above applications having the same assignee as the present invention, and each incorporated herein by reference in their entirety.

REFERENCE TO MICROFICHE APPENDIX

Microfiche Appendix A consists of 3 sheets of 224 total frames of microfiche submitted under 37 C.F.R. § 1.96 and is a part of this disclosure. Microfiche Appendix A includes source code written in AIDA register transfer language specifying an arbiter and micro-translation lookaside buffer in accordance with the present invention.

BACKGROUND OF THE INVENTION

1. Field of the Invention

This disclosure relates to memory management units (MMUs) containing a translation lookaside buffer (TLB) used to speed up address translation in a computer system supporting virtual memory and also to MMUs containing an arbiter that selects one of two or more pending address translation requests.

2. Technical Background of the Invention

In computers supporting a virtual memory system, the address space referenced by the central processing unit (CPU) is called "virtual memory" and each virtual address specified by the CPU is translated by the memory management unit (MMU) to a physical (or real) address. The MMU passes this real address to the main memory subsystem (MSU) which retrieves or stores the accessed item. Some MMUs in the prior art can receive several translation requests in one cycle (corresponding, for example, to the virtual addresses of two operands of the currently executing instruction and the virtual address of the next instruction to be executed). However, these MMUs can only translate one virtual address at a time. It would be desirable for MMUs to be able to translate more than one virtual address at a time without incurring significant additional cost in terms of hardware.

For various reasons, some virtual to real address translation schemes involve two stages. In order to reduce the average time required for address translation it would be desirable if at least some addresses could be translated directly from virtual address to physical address in one stage.

SUMMARY

A memory management unit (MMU) containing a micro-translation lookaside buffer ($\mu$TLB) capable of simultaneously servicing three requests supplied to the MMU by an instruction cache and 2 data caches, respectively, is disclosed. The μTLB is an 8-entry fully associative table, where each entry can store a virtual address, a corresponding real address and various status bits. Each entry of μTLB is associated with three comparators, thereby the μTLB has the capability to simultaneously compare each of three virtual addresses received by the MMU from the instruction cache and two data caches, respectively, with each virtual address stored in an entry of the μTLB.

If an entry storing a specified virtual address is not found in the μTLB, then conventional one-address-at-a-time translation by the MMU is performed for the specified virtual address that involves accessing two much larger translation lookaside tables and possibly (upon misses in these larger TLBs) tables held in main memory. After a successful regular translation of a virtual address into a real address, the virtual address and real address may be inserted into an entry of μTLB.

An arbiter selects one of several pending requests received from caches of different priorities for immediate processing by the MMU, using a method which avoids undue delay in servicing requests from caches of lower priority. In particular, the arbiter will not select a request from a cache of a particular priority if it last selected a request from that cache and at the time of that last selection there were pending requests of lower priority.

DETAILED DESCRIPTION OF THE PREFERRED EMBODIMENTS

Figure 1:
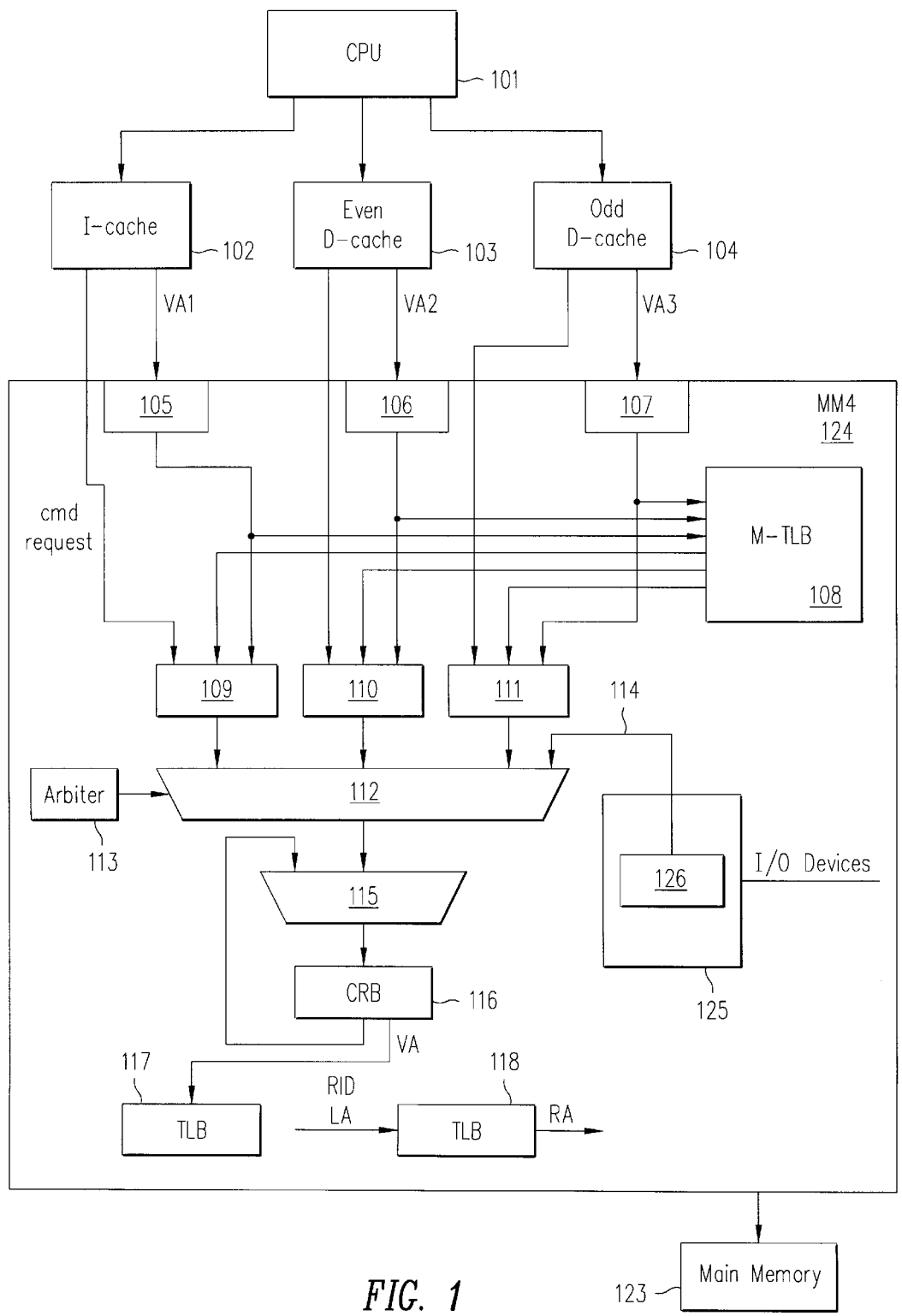
FIG. 1 illustrates an MMU in accordance with the present invention.

One embodiment of an MMU in accordance with the present invention is depicted in FIG. 1. CPU 101 specifies an instruction address or data (operand) address by sending a virtual address to instruction cache (I-cache) 102 or one of data caches 103 (even data cache) and 104 (odd data cache), respectively. Even and odd data caches 103 and 104 are provided for the purpose of memory interleaving but are otherwise similar and are each conventional as is cache 102. In other embodiments, there could be a variety of cache combinations such as one instruction cache and one data cache.

Each of caches 102, 103 and 104 is virtually addressed and can receive a read or write request from CPU 101 in the same cycle. If a requested item at the specified virtual address is present in the appropriate cache, the item is returned to the CPU (or written into the cache in the case of a write request) and there is no need for translation by MMU 124 of the specified virtual address into a physical or real address. Each virtual address is 64 bits with the low order 13 bits specifying an offset within a page. Thus, MMU 124 translates the 51 high order bits of a virtual address into a real address specifying the start address of a page. The term virtual address used below will refer to these 51 high order bits.

If the requested item is not present in the appropriate cache, then MMU 124 translates the specified virtual address into a physical address and then retrieves (or writes into) the item (instruction or operand) stored at that physical address in main memory 123. MMU 124 first tries to find the real address corresponding to the specified virtual address in micro-TLB (μTLB) 108, which is e.g. an 8-entry fully associative cache memory. Each entry of μTLB 108 can store a 51-bit virtual address tag, a corresponding physical address and various status bits (e.g. protection bits) and is associated with three comparators, thereby giving μTLB 108 the capability of simultaneously comparing each of three virtual addresses received by MMU 124 from caches 102, 103 and 104, respectively, with each virtual address stored in an entry of μTLB 108. In other embodiments, μTLB 108 could be any other suitable memory with the appropriate comparison hardware.

The status bits of an entry of μTLB 108 include 6 protection bits (read/write/execute for user and supervisory modes), a valid bit and a modify bit. The modify bit indicates whether or not the memory page starting at the real address stored in the entry of μTLB 108 has been modified and thus must be written out to disk before being overwritten by another disk page. The valid bit indicates whether there is a valid translation stored in the entry.

Figure 2:
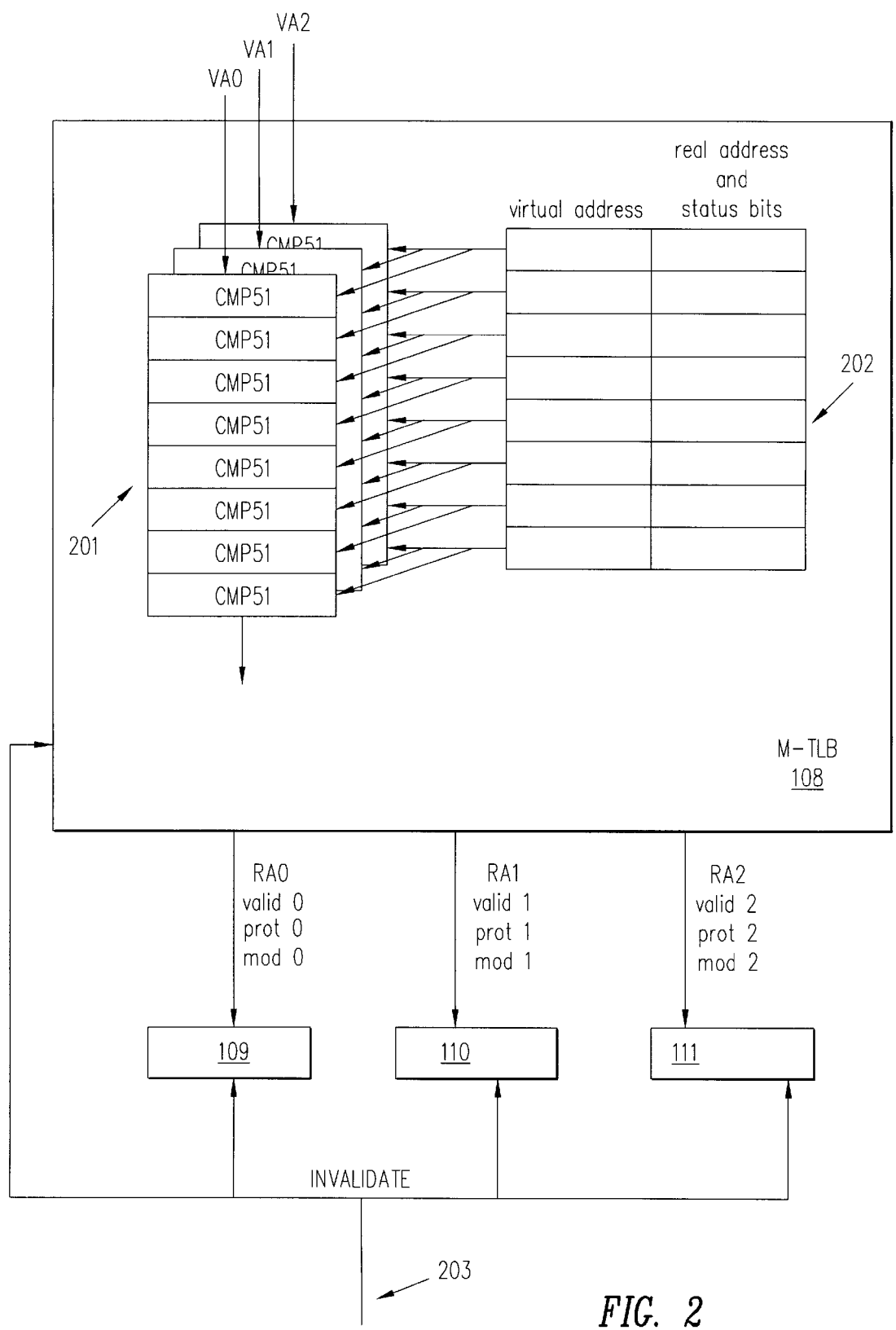
FIG. 2 illustrates a micro-TLB in accordance with the present invention.

The structure of μTLB 108 is shown in FIG. 2. The address field of each of eight entries 202 of μTLB 108 is shown as an input to three of twenty-four 51-bit comparators 201 which receive virtual addresses VA0, VA1 and VA2, respectively, as the other input. If the valid bit of one of entries 202 is set to one and the virtual address stored in that entry is equal to VA0, VA1, or VA2 then a hit in the μTLB 108 occurs and the real address and status bits (i.e. valid, protection and modify bits) of that entry are stored in command request buffer 109, 110 or 111, respectively.

When a specified virtual address matches the virtual address in a valid entry in μTLB 108 whose modify bit is set to zero but the specified virtual address is associated with a write request (as indicated by the command information in one of command request buffers 109, 110 or 111 received from the corresponding one of caches 102, 103 and 104), the field of the corresponding command request buffer indicating a miss or hit in μTLB 108 is set to indicate a miss. It is necessary to force this translation to go through TLBs 117 and 118, as described below, in order for the modify bit in the entry of TLB 118 corresponding to the translation to be set to one, for reasons described below.

μTLB 108 also receives an INVALIDATE signal on line 203, generated by MMU 124, which if asserted invalidates the contents of μTLB 108 by setting the valid bit of each of its entries to zero. In addition, an asserted INVALIDATE signal results in setting the field of command request buffers 109, 110 and 111 that indicates a miss or hit in μTLB 108 to indicate a miss. The INVALIDATE signal is also asserted upon a context switch (i.e. when a different process starts to execute) and upon the execution of a particular CPU instruction.

If μTLB 108 does not contain an entry corresponding to a specified virtual address, then MMU translates the specified virtual address in two stages. In the first stage, the virtual address is translated into a region id (Rid) and a logical address (LA). In the second stage, the region id and logical address are translated into a real address (RA) that specifies the start address of a page of $2^{14}$ bytes.

The translations in stages 1 and 2 are first attempted by accessing TLBs 117 and 118 respectively. TLB 117 is a 128-entry fully associative memory which converts a virtual address to a region id and a logical address. Each entry of TLB 117 stores a virtual address, corresponding region id, corresponding offset (the corresponding logical address needed to perform the second stage of translation is computed from the sum of the virtual address and the offset) and six protection bits (read/write/execute for user and supervisory modes).

TLB 118 is a 1024-entry (256×4) 4-way-set-associative SRAM which converts a region id and logical address pair to a real address. Each entry of TLB 118 has been retrieved from a page table stored in memory 123 and stores a real address (RA), six protection bits (read/write/execute for user and supervisory modes) and a modify bit. The modify bit is set to one if the page in main memory whose start address is RA has been modified. The modify bit of the entries of TLB 118 are used to keep current the modify bits of the corresponding page table entries in memory. It is important that the modify bits of these latter entries be kept current because the computer system's operating system relies on the modify bit in deciding whether or not a given page in memory must be written to disk before another disk page can be read into that memory page. For this reason, translation through TLBs 117 and 118 will proceed in some circumstances (as described above in connection with the modify bit of an entry of $\mu$TLB 108) even when $\mu$TLB 108 holds a valid entry storing a specific virtual address, in order to ensure that the modify bit of the entry of TLB 118 corresponding to a modified page is set to one (which would not occur if TLBs 117 and 118 were bypassed because of a hit in $\mu$TLB 108).

If either TLB 117 or TLB 118 does not hold the necessary translation, then MMU 124 initiates memory accesses to tables stored by main memory 123 in order to retrieve the requested translation and to load it into TLB 117 or TLB 118. After a two level translation from a virtual address into a physical address has occurred, MMU 124 may insert the virtual address/physical address pair (as well as various status bits including 6 protection bits that are the logical AND of the 6 protection bits stored in the accessed entry of TLB 117 and the 6 protection bits of the accessed entry of TLB 118) into an entry of $\mu$TLB 108.

Some of the advantages of having a $\mu$TLB can be illustrated by considering the situation where caches 102, 103 and 104 receive requests for information stored at virtual addresses VA1, VA2 and VA3, respectively, from CPU 101 in the same cycle ("cycle 1"). In cycle 2 the following occur:
1) MMU input buffers 105, 106 and 107 receive virtual addresses VA1, VA2 and VA3, respectively, from caches 102, 103 and 104, respectively.
2) $\mu$TLB 108, which receives the outputs of MMU input buffers 105, 106 and 107, compares each of VA1, VA2 and VA3 against each of the 8 entries of $\mu$TLB 108. Each entry of $\mu$TLB 108 is implemented as a general purpose register and, as described above, is associated with three comparators for simultaneously comparing the virtual address stored in the entry with the virtual address received by $\mu$TLB 108 from MMU input buffers 105, 106 and 107, respectively. Thus, $\mu$TLB 108 can support parallel access for three virtual addresses supplied by CPU 101 to caches 102, 103 and 104, respectively.
3) Caches 102, 103 and 104 search for an entry corresponding to VA1, VA2, and VA3, respectively.

In cycle 3 the following events occur:
1) Command Request buffer 109 receives VA1 from MMU input buffer 105 and command request data from cache 102, if there was a miss in cache 102. Otherwise, a valid command request will not be stored in buffer 109, since CPU 101 can read from or write into cache 102 the item at the specified virtual address. Analogous events occur for command request buffers 110 and 111.

2) Command request buffers 109 also receives $\mu$TLB hit/miss information, indicating whether VA1 was found in $\mu$TLB 108, and a real address corresponding to VA1 in the case of a hit in $\mu$TLB 108. Analogous events occur for buffers 110 and 111. It is important to note that the use of $\mu$TLB 108 does not delay the regular two-stage translation of a virtual address by MMU 124 because command request buffers 109, 110 and 111 receive the results from the search of $\mu$TLB 108 in the same cycle that they receive command requests from caches 102, 103 and 104 upon a cache-miss.

In cycle 4 the following events occur:
1) Arbiter 113 selects a valid command request from one of command request buffers 109, 110, 111 or 126 by controlling multiplexer 112. Command buffer 126 in I/O controller 125 stores a direct memory access (DMA) request. It will be assumed for concreteness that command request buffer 109 is selected. The contents of buffer 109 are passed through multiplexer 115 to current request buffer (CRB) 116. Buffer 109 is now free to accept another command request from cache 102. In subsequent cycles MMU 124 will cause MUX 115 to select the contents of CRB 116 until the processing of the command request stored therein is completed and MMU 124 begins to process another command request.
2) If the contents of CRB 116 indicate a $\mu$TLB hit, then MMU 124 does not initiate a two stage translation of VA1 but rather the request in CRB 116 (including a real address corresponding to VA1 which was received from $\mu$TLB 108 by buffer 109 in cycle 3) is issued by MMU 124 to main memory 123 assuming that the protection bits returned from $\mu$TLB 108 do not indicate a protection violation. At this point CRB 116 is free to accept another valid command request from one of buffers 109, 110, 111 or 125 for processing. If the contents of CRB 116 indicate a $\mu$TLB miss then MMU 124 initiates parallel access of TLB 117 and TLB 118 which perform the first and second stages of address translation, respectively.

In cycle 5, the following events occur assuming that the contents of CRB 116 indicate a $\mu$TLB miss:
1) TLB 117 is accessed to find a region id and logical address (Rid1 and LA1) corresponding to VA1. If TLB 118 does not have an entry corresponding to VA1 then MMU 124 must initiate one or more requests to memory 123 to retrieve tables storing Rid1 and LA1.
2) TLB 118 is accessed to find a real address corresponding to the Rid/logical address pair of Rid_last_cache_109, VA1, where Rid_last_cache_109 is the Rid associated with the previous virtual address received from cache 109 on which MMU 124 performed two-stage address translation. MMU 124 stores similar Rids for caches 110 and 111. By assuming values, i.e. Rid_last_cache_109 and VA1, respectively, for Rid1 and LA1 (which are not available until TLB 117 has been searched), MMU 124 can initiate the search of TLBs 117 and 118 at the same time, thereby potentially reducing the time for two-stage translation from two cycles to one cycle.

In cycle 6 the following occurs, assuming hits occurred in both TLB 117 and 118 during cycle 5. If Rid1 is not equal to Rid last_cache_109 or LA1 is not equal to VA1, then TLB 118 must be searched for a real address RA1, corresponding to the region id and logical address pair of Rid1 and LA1 (in which case the delivery of a real address corresponding to VA1 to MUS 123 will occur at the earliest in cycle 7). If Rid1 is equal to Rid_last_cache_109 and LA1 is equal to VA1, then MMU 124 accesses memory 123 to read from or write into the memory page starting at the real address (i.e. RA1) returned by TLB 118 in cycle 5, after examining the protection bits returned by TLB 117 and 118 and determining that no protection violation has occurred.

After a successful 2-stage translation for VA1, MMU 124 may insert (although not in certain circumstances some of which are indicated below) a new entry into μTLB 108 to store VA1 and corresponding real address RA1 returned from TLB 118. The valid bit of this entry will be set to one. As well, 6 protection bits (user read/write/execute and supervisor read/write/execute) that are the logical AND of the corresponding protection bits returned by TLBs 117 and 118 are inserted into the new entry of μTLB 108. In addition, if the request is for a write access the modify bit of the entry inserted into μTLB 108 is set to 1, thereby indicating that the memory page starting at RA1 has been modified.

The replacement policy for μTLB 108 is first-in first-out (FIFO). Given the locality of reference exhibited by most programs, CPU 101 is likely to refer to VA1 many times in the future. In general, a high percentage of virtual addresses specified by CPU 101 would be expected to hit in μTLB 108 despite its small size.

A new entry will not be inserted into μTLB 108 in some circumstances, including the following:
1) an entry for VA1 already exits in μTLB 108. This situation could occur despite the fact that MMU 124 performed two-stage translation for VA1 upon a miss in μTLB 108. After this miss, a request for VA1 from cache 110 or 111 may have proceeded to two-stage translation (thereby resulting in an insertion into μTLB 108 for VA1) before the request for VA1 from cache 109. In order to not waste an entry of μTLB 108, MMU 124 checks to see if an entry already exists for VA1 before inserting.
2) the request for VA1 was not cacheable. Virtual addresses associated with noncacheable requests are unlikely to be repeatedly referenced.
3) the current request generates a protection violation.

Providing μTLB 108 in MMU 124 results in various advantages including the following, without delaying regular two-stage translation by MMU 124:

a) μTLB 108 can service up to three requests (i.e. one from each of caches 102, 103 and 104) in the same cycle. In contrast, without μTLB 108 MMU 124 can only perform two-stage address translation on one virtual address at a time.

b) Furthermore, MMU 124 may require a cycle merely to select one of several pending command requests. This is of course avoided by μTLB 108 which need not make any such selection.

c) Unlike a hit in μTLB 108, which takes 1 cycle, two-stage translation takes at least 2 cycles if the proper values for RiD1 and LA1 are not guessed when accessing TLB 118 simultaneously with TLB 117 in cycle 5. This problem is sometimes referred to as "starvation" (of the lower priority caches).

As discussed above, arbiter 113 must select a valid command request stored in one of command request buffers 109, 110, 111 and 126 for translation since MMU (aside from μTLB 108) can only translate one address at a time.

In one embodiment, arbiter 113 makes this selection as follows. Arbiter 113 always selects the command request, i.e. DMA request, from command request buffer 126 if there is one. Command buffers 109, 110, and 111 are given highest, intermediate and lowest priorities respectively. A potential problem of undue delay in servicing a request in command buffer 110 or 111 could arise if the pending request in command request buffer 109 were always selected. This is because a new request from cache 102 could arrive into command request buffer 109 while the current request in CRB 116 (which was taken from command request buffer 109) is processed.

Figure 3:
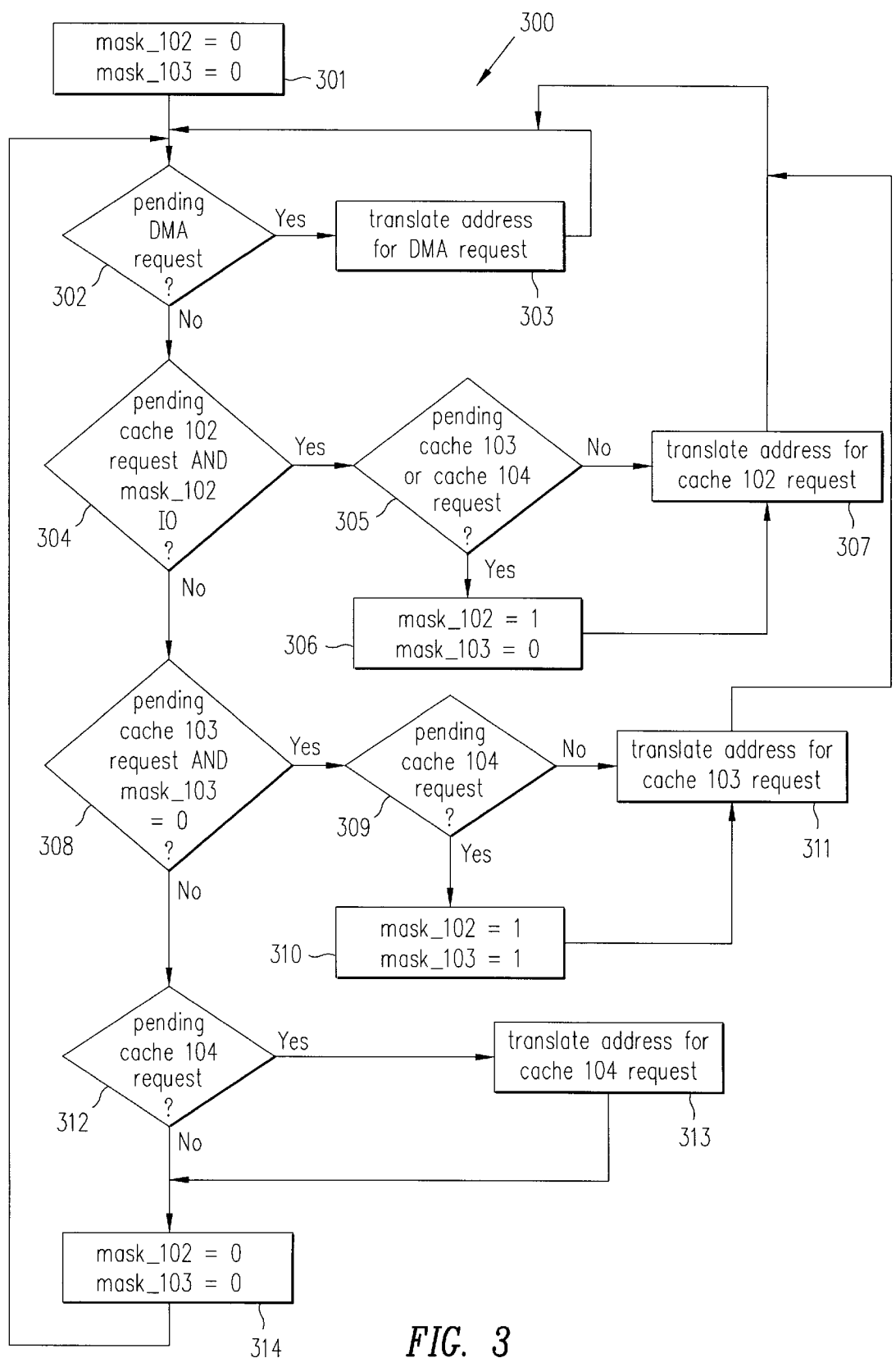
FIG. 3 is a flowchart indicating the processing performed by an address translation request arbiter.

Arbiter 113 performs in logic circuitry the processing depicted in flowchart 200 of FIG. 3 to avoid the problem of starvation. Arbiter avoids starvation by setting a mask bit associated with a particular command request buffer when selecting the request in that buffer, if at the time of selection there is a pending request in a command request buffer of lower priority. This ensures that the next request to be selected will come from a command request buffer of lower priority.

Processing begins in step 301 where mask bits mask__102 and mask__103 are initialized to zero. Processing transfers from step 301 to decision step 302. In decision step 302 arbiter 113 determines whether or not there is a pending DMA request in command request buffer 126. If there is a pending DMA request, then processing transfers from step 302 to step 303, during which MMU performs a one stage translation for the DMA request. Then processing transfers from step 303 to decision step 302.

If there is no pending DMA request, then processing transfers from decision step 302 to decision step 304 where arbiter 113 determines whether there is a pending command request in command request buffer 109 (i.e. from cache 102) and mask-102 is zero. If at least one of the conditions examined in decision step 304 is not met, then processing transfers to step 308, which is described further below. If both conditions examined in decision step 304 are met then processing transfers to step 305.

In step 305, arbiter 113 determines whether there is a valid command request in either command request buffer 110 or 111 (i.e. from caches 103 or 104). If there is no such request, then processing transfers to step 307, described further below. If there is a valid command request in either command request buffer 110 or 111, then processing transfers to step 306, where mask__102 is set to one and mask__103 is set to zero. (The setting of mask__102 to one ensures that the next request selected by arbiter 113 after the current pending request from command request buffer 109 is processed will not be another request from command request buffer 109.) Processing then transfers from step 306 to step 307. In step 307, MMU 124 performs two-stage address translation for the pending request in command request buffer 109. Processing then transfers from step 307 to decision step 302.

In step 308, arbiter 113 determines whether there is a pending command request in command request buffer 110 (i.e. from cache 103) and mask__103 is zero. If at least one of the conditions examined in decision step 308 is not met, then processing transfers to step 312, which is described further below. If both conditions examined in decision step 308 are met, then processing transfers to step 309.

In step 309, arbiter 113 determines whether there is a valid command request in command request buffer 111 (i.e. from cache 104). If there is no such request, then processing transfers to step 311, described further below. If there is a valid command request in command request buffer 111, then processing transfers to step 310, where mask__102 is set to one and mask__103 is set to one. (The setting of mask__102 and mask__103 to one ensures that the next request selected by arbiter 113 after the current pending request from command request buffer 110 is processed will not be another request from command request buffer 110 or a request from command request buffer 109.) Processing transfers from step 310 to step 311. In step 311, MMU 124 performs two-stage address translation for the pending request in command request buffer 110. Processing then transfers from step 311 to decision step 302.

In step 312, arbiter 113 determines if there is a pending request in command request buffer 111 (i.e. from cache 104).

If not, processing transfers to step 314, described further below. If arbiter 113 determines that there is such a request in step 312, then processing transfers to step 313, where MMU 124 performs 2-stage address translation for the request. Processing transfers from step 313 to step 314, where mask_102 and mask_103 are set to zero.

This disclosure contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Microfiche Appendix A contains AIDA source code (RTL) files which when compiled produce a flattened netlist file. The compilation uses a conventional technology library containing a macro definition for each macro invoked in the AIDA RTL files. Using a translation tool, the netlist file can be converted into an input file for the GARDS placement and routing tool sold by Silverlisco. The output of the GARDS tool can be used to produce masks to fabricate integrated circuit for the part of the MMU illustrated in FIG. 1 (except TLB 117 and 118 and I/O controller 125) including arbiter 113 and μTLB 108.

Printed Appendix B consists of two papers, "Architecture Overview of HaL Systems" and "Microarchitecture of HaL's Memory Management Unit", and 3 parts of the HaL Memory Management Compendium version 4.4 (section 2.1: "Basic Concepts"; chapter 4: "MMU Data Structures" and chapter 10: "View Lookaside Buffer") of Hal Computer Systems, Inc., that describe various aspects of a computer system which may include the present invention.

This disclosure is illustrative and not limiting; further modifications will be apparent to one skilled in the art and are intended to fall within the scope of the appended claims.

What is claimed is:

1. A memory management unit for virtual to physical address translation in a computer system, comprising a translation lookaside buffer which includes a plurality of entries and a plurality of comparators for each of said entries, wherein each of said entries has an address field, the address field of each of said entries is connected to a first input line of each of said plurality of comparators for said entry, a respective one of a plurality of signals, each signal indicating a respective virtual address to be translated by said memory management unit, is carried on a second input line of each of said plurality of comparators and the addresses stored in the address field of each of said entries are each simultaneously compared with each of the virtual addresses indicated by a respective one of said plurality of signals; further comprising:

a plurality of caches;

a plurality of input buffers;

a plurality of command request buffers, each connected to receive signals from (a) said translation-lookaside-buffer, (b) a plurality of caches, and (c) said plurality of input buffers, wherein said plurality of input buffers are also connected to receive signals from said plurality of caches; and arbiter logic, connected to receive signals from said plurality of command request buffers and which selects one of the signals received from said command request buffers and determines which of said signals received from said command request buffers is to be processed.

2. The memory management unit of claim 1, further comprising second and third translation-lookaside-buffers, wherein said second translation-lookaside-buffer is connected to receive signals from said arbiter logic and is further connected to provide signals to said third translation-lookaside-buffer.

3. The memory management unit of claim 2, wherein said second and third translation-lookaside-buffer are accessed when said plurality of comparators indicate that none of said address fields of each entry of said translation-lookaside-buffer equals any of said virtual addresses.

4. The memory management unit of claim 1, wherein one of said plurality of signals indicating a respective virtual address to be translated by said memory management unit is provided from a first of said plurality of caches, a second of said plurality of signals is provided from a second of said plurality of caches, and a third of said plurality of signals is provided from a third of said plurality of caches.

5. The memory management unit of claim 1, wherein a first and second of said plurality of caches are, respectively, even and odd data caches for interleaved memory, and a third of said plurality of caches is an instruction cache.

6. The memory management unit of claim 1, wherein said plurality of entries in said translation-lookaside-buffer are replaced on a first-in-first-out basis.

7. The memory management unit of claim 1, wherein said command request buffers are connected to receive output signals from said comparators and are connected to receive one of either addresses and commands in a same memory cycle as said command request buffers receive output signals from said comparators.

8. A method for arbitrating among a plurality of pending requests for processing, each pending command request being in a buffer having an associated priority, comprising the steps of:

(a) selecting a pending command request from a first buffer having a highest priority for processing;

(b) if at a time of selecting said pending request there is a pending command request in another buffer having a lower priority, setting a masking bit associated with said pending command request from said first buffer;

(c) processing said pending command request from said first buffer;

(d) after processing said pending command request from said first buffer, selecting as the next pending request a command request from another buffer having a lower priority, in accordance with said masking bit;

(e) processing a pending request from said another buffer having a lower priority, even if an additional command request is pending in said first buffer;

(f) initializing the masking bits associated with each buffer; and (g) repeating steps (a) through (f) until all of said pending command requests are processed.

9. The method of claim 8, wherein said step of initializing comprises setting the masking bit associated with each buffer to a value of zero.

10. The method of claim 8, further comprising the step of processing a direct memory access before processing any pending command request.

* * * * *